(12) United States Patent
Gattanini

(10) Patent No.: US 12,726,014 B2
(45) Date of Patent: Sep. 1, 2026

(54) PROTECTION CIRCUIT FOR POWER SUPPLY DEVICES, PARTICULARLY FOR EXPLOSION-PROOF APPLICATIONS

(71) Applicant: Pepperl+Fuchs SE, Mannheim (DE)

(72) Inventor: Carlo Gattanini, Mannheim (DE)

(73) Assignee: Pepperl+Fuchs SE, Mannheim (DE)

( * ) Notice: Subject to any disclaimer, the term of this patent is extended or adjusted under 35 U.S.C. 154(b) by 196 days.

(21) Appl. No.: 18/644,900

(22) Filed: Apr. 24, 2024

(65) Prior Publication Data

US 2024/0380197 A1 Nov. 14, 2024

(30) Foreign Application Priority Data

May 12, 2023 (EP) .................................... 23173147

(51) Int. Cl.
*H02H 7/12* (2006.01)

(52) U.S. Cl.
CPC ................................ *H02H 7/1213* (2013.01)

(58) Field of Classification Search
CPC ...... H02H 7/1213; H02H 9/008; H02H 9/041; H02H 9/042; H02H 7/1222; H02H 7/1227; H02M 7/537
USPC ........................................................ 361/91.6
See application file for complete search history.

(56) References Cited

U.S. PATENT DOCUMENTS 5,606,232 A * 2/1997 Harlan ...................... H02P 6/00 318/800
5,991,175 A * 11/1999 Liu .................... H03K 17/0822 361/101
6,829,129 B2 * 12/2004 Marsh .................... H02H 9/042 361/111
9,018,865 B2 * 4/2015 Meyer, III ............. B60L 15/20 320/135
11,689,194 B2 * 6/2023 Lee ........................ H02H 9/025 327/427
12,381,387 B1 * 8/2025 Leung .................... H02H 9/005
2002/0057540 A1 * 5/2002 Ito ........................ H03K 17/105 361/18

(Continued)

FOREIGN PATENT DOCUMENTS

CN 120728532 A * 9/2025 ............... H02H 9/04
DE 19959716 A1 * 2/2001 ............. H02M 1/32

(Continued)

OTHER PUBLICATIONS

Lempidis, Georgios; Title: Overvoltage protection circuit, power converter, electric drive device and vehicle; Entire specification and drawings (Year: 2020).*

(Continued)

*Primary Examiner* — Dharti H Patel
(74) *Attorney, Agent, or Firm* — Andrus Intellectual Property Law, LLP

(57) ABSTRACT

A protection circuit for a power converter, particularly for explosion protection applications, includes a series connection of a reverse-polarized Zener diode and a resistor to be coupled between a high and a low potential supply line of the power converter. A semiconductor switch is directly coupled between the high and low potential supply line with its conduction path. A control terminal of the semiconductor switch is coupled with or controlled by a node between the Zener diode and the resistor.

8 Claims, 6 Drawing Sheets

(56) References Cited

U.S. PATENT DOCUMENTS

2003/0072115 A1* 4/2003 Reid ..................... H02H 1/066 361/56
2003/0141918 A1 7/2003 Uno
2004/0070374 A1* 4/2004 Ito ..................... H02M 3/156 323/222
2005/0073428 A1* 4/2005 Sugimoto ............. G01R 15/04 340/815.45
2006/0164780 A1* 7/2006 Lark ..................... H02H 9/008 361/118
2007/0268638 A1* 11/2007 Fankhauser ........... H02H 9/041 361/56
2009/0262473 A1* 10/2009 Weinert ................ H02H 9/008 361/56
2012/0176707 A1* 7/2012 Vashchenko .......... H02H 9/046 361/56
2013/0021702 A1* 1/2013 Waltman .............. H02M 3/156 361/91.1
2013/0100710 A1* 4/2013 Kang ..................... H02H 7/125 361/118
2014/0146426 A1* 5/2014 Murakami ....... H03K 19/00315 361/56
2014/0177304 A1* 6/2014 Sadwick ................ H02M 7/06 363/126
2014/0265899 A1* 9/2014 Sadwick ............. H05B 45/395 315/200 R
2015/0042177 A1* 2/2015 Weyers ................ H10D 84/811 307/115
2015/0043116 A1* 2/2015 Weyers ................ H03K 17/567 257/272
2015/0333509 A1* 11/2015 Jankowski ............ H02H 7/042 361/35
2016/0322907 A1* 11/2016 Hwang .................. H02M 1/36
2017/0063072 A1* 3/2017 Miller ..................... H02H 3/08
2017/0365999 A1* 12/2017 Cao ...................... H02M 1/096
2018/0034270 A1* 2/2018 Jutras ................ H05B 45/3725
2019/0190396 A1* 6/2019 Wei ......................... H02M 1/36
2019/0207598 A1* 7/2019 Yu ..................... H03K 17/0822
2020/0244093 A1* 7/2020 Loy-Lafond ............ H02H 3/14
2022/0006374 A1* 1/2022 Warnes ............... H02H 11/003
2022/0069569 A1* 3/2022 Lin ......................... H02H 9/04
2022/0115861 A1* 4/2022 Warnes ............... H02H 7/1213
2022/0416681 A1* 12/2022 Telefus ................. H05B 45/10
2023/0067022 A1* 3/2023 Huang ............. H02M 3/33523
2023/0162937 A1* 5/2023 Telefus ................... H02H 3/08 361/2
2024/0204765 A1* 6/2024 Dake ............... H03K 17/08122
2024/0243742 A1* 7/2024 Orlowske ............. H03K 17/78
2024/0380197 A1* 11/2024 Gattanini ............ H02H 7/1222

FOREIGN PATENT DOCUMENTS

DE 102016105665 B4 11/2019
EP 2093871 A1 * 8/2009 .............. H02M 1/32
EP 2093872 A1 * 8/2009 .............. H02M 1/32
EP 3021444 A1 * 5/2016 ............. H02H 9/005
EP 3540771 A1 9/2019
EP 3742568 A1 * 11/2020 ............. H02H 9/041
EP 3261121 B1 12/2020
GB 1110123 A 4/1968
KR 20070118898 A * 12/2007 .............. H02M 1/32
KR 20160057079 A * 5/2016 ............... H02H 9/04
KR 20200009421 A * 1/2020 ............... H02H 9/04

OTHER PUBLICATIONS

Boecker; Title: Circuit for protection against overvoltages; Entire specification and drawings (Year: 2016).*

Extended European Search Report for European Patent Application No. 23173147.2, dated Oct. 20, 2023.

* cited by examiner

Um
F2
T1
2
$V_H$
DC
AC
$V_L$
+
-
F1
$U_0$
L1
L2
3
3x
DZ1
R1
B
TR1
A
Iz
C
E
D1
Ro
Io
$U_0$
$V_H$
+
$V_L$
-
L

Um
F2
T1
DC
AC
VH
VL
+
-
F1
3x
3
R2
DZ2
G
Iz
S
D
A
PMOS
L1
L2
Ro
Io
U0
VH
VL
+
-
L

F2
Um
T1
DC
AC
VH
VL
+
-
F1
3
3x
DZ2
B
R4
R2
C
E
G
TR4
NPN
Iz
S
D
A
TR3
P-MOS
L1
L2
Ro
Io
U0
VH
VL
+
-
L

PROTECTION CIRCUIT FOR POWER SUPPLY DEVICES, PARTICULARLY FOR EXPLOSION-PROOF APPLICATIONS

CROSS-REFERENCE TO RELATED APPLICATIONS

This application claims priority to EP23173147.2, filed May 12, 2023, which is incorporated herein by reference in its entirety.

TECHNICAL FIELD

The present invention relates to power converters, particularly for use with explosion-proof applications, comprising protections against overvoltages and overcurrents.

TECHNICAL BACKGROUND

Power supply for many applications is provided by power converters usually including AC-DC or DC-DC converters. When operating applications in hazardous areas, measures must be taken to prevent sparks and heat generation or the like from igniting flammable materials according to the standards 60079-0 and 60079-11. Typically, these applications are powered by a power supply device that converts an input voltage, such as a grid voltage, down to a supply voltage for the hazardous area application. Usually, there power supply devices are designed for a power range of few Watts.

To protect the output side of these power supply devices from overvoltage and overcurrent, a protection circuit is provided internally in the power supply device. Specifically, for protecting against overvoltage, high power Zener diodes are used to limit the output voltage to the breakthrough voltage. When an overvoltage event occurs, the current through the Zener diode increases until a safety breaker device such as a fuse, in the current path is blown. Because of the delay between the currents of an overvoltage event and the fuse blowing, the Zener diode must carry the current flowing therethrough. Furthermore, the standard 60079-11 requires that the Zener diode must be able to carry indefinitely a current equal to 1.7 the fuse rating. For this reason, high-power Zener diodes with a nominal power of between 3 to 5 Watts are typically used.

In general, high power Zener diodes are commonly used as voltage limiters in explosion-proof applications. However, the availability of high-power Zener diodes is limited so that other approaches have been used to provide overvoltage protection. Common solutions are to use shunt voltage limiters by using simple diodes or simple Zener diodes or by using a crowbar circuitry based on SCR and/or TRIACs and/or thyristors. The latter is substantially more complex and more expensive than the diode approach. However, the availability of high-power Zener diodes is limited so that other approaches to overvoltage and overcurrent protection may be considered.

It is therefore an object of the present invention to provide a protection circuit which avoids high-power Zener diodes in a cost effective manner.

SUMMARY OF THE INVENTION

This object has been achieved by the protection circuit according to claim 1, and the power supply device according to the further independent claim.

Further embodiments are indicated in the depending subclaims.

According to a first aspect a protection circuit for a power converter, particularly for explosion-protection applications, is provided, comprising:

- a series connection of a reverse-polarized Zener diode and a resistor to be coupled between a high potential and a low potential supply line of the power converter;
- a semiconductor switch particularly directly coupled between the high potential and low potential supply line with its conduction path (channel) wherein a control terminal of the semiconductor switch is coupled with or controlled by a node between the Zener diode and the resistor.

It may be provided that the semiconductor switch is configured to become conductive when a voltage over the resistor increases over a threshold voltage.

The main effect of the present invention is a replacement of the high-power Zener diode with a protection circuitry which imitates the behavior of a high-power Zener diode in terms of electrical and thermal characteristics. The circuit is to be made from standard electronic components which are widely available. The protection circuit can be used as shunt voltage limiter according to a standard 60079-11 without or only with little modification to the rest of the device, in particular to the rest of the power converter device.

Basically, on an output side of a power converter, a safety breaker element such as a fuse is placed in a load current path, and a Zener diode is connected between the power lines. For redundancy, multiple Zener diodes in parallel can be used. Zener diodes are usually reversed polarized so that they limit the voltage on the voltage supply line to a breakthrough voltage above which the current through the Zener diode steeply increases keeping the voltage over the high potential and low potential supply lines substantially constant. In the event of an overvoltage, the increased current will also flow through the safety breaker element (fuse) eventually blowing it.

Basically, the high-power Zener diode is replaced by a circuit which uses a semiconductor switch which is controlled by a series connection of a low-power Zener diode and a resistor between the voltage supply lines. The series connection effectively allows to limit the current through the series connection by selecting the resistance of the resistor so that a low power Zener diode can be used.

The voltage potential between the Zener diode and the resistor is used to control the semiconductor switch. The control is effected in that once an overvoltage occurs between the power lines, the voltage over the resistor increases as the Zener diode voltage remains basically constant. The voltage protection threshold is defined by the breakthrough voltage of the Zener diode and the junction voltage of the semiconductor switch.

According to an embodiment, the semiconductor switch may be a bipolar transistor which is configured to have the control terminal current controlled, wherein the sensitive emitter basis path through the semiconductor switch is in parallel with the resistor. The control terminal (base terminal) of the semiconductor switch may be directly coupled with the node.

Direct coupling as used herein means that the terminals are connected with a conductor without a significant resistance, i.e. a negligible resistance which does not affect the function of the circuit.

In case of a bipolar transistor the junction voltage is about 0.7 V. Consequently, once the voltage over the resistor increases beyond the junction voltage, the semiconductor switch becomes conductive carrying a current which tends to blow the fuse.

Furthermore, a standard diode or a Schottky diode may be provided between the high potential and low potential supply lines with reverse polarization to avoid negative effects due to the accidental occurrence of a negative polarization over the high potential and low potential supply lines.

The maximum power is defined by the semiconductor switch that carries a current which is hFE times higher than the current flowing in the Zener diode. hFE which may also be referred to as β is the factor by which the base current is amplified to produce the amplified current of the bipolar transistor. The unamplified current is the base current, which then undergoes amplification by a factor of hFE to produce an amplified current which flows through the collector and emitter terminals.

The power dissipation of the semiconductor switch depends on its characteristics, such as its mounting condition and its maximum junction temperature. The forward voltage is defined by the reverse-polarized diode in parallel to the current path of the semiconductor switch.

The leakage current is mainly flowing through the Zener diode, while the resistor shunts the leakage current of the Zener diode, so to avoid the amplification of the semiconductor switch.

The turn-on delay time is very low and comparable to the delay time of a high-power Zener diode to be replaced by the proposed circuit.

Alternatively, the semiconductor switch may be a MOSFET transistor which is configured to have the control terminal voltage controlled, wherein the sensitive gate-source path through the semiconductor switch is in parallel with the resistor. The control terminal (gate terminal) of the semiconductor switch may be directly coupled with the node. Instead of the reverse polarized standard diode or Schottky diode, an intrinsic diode can be used if the semiconductor switch is provided as a MOSFET transistor.

According to an embodiment the MOSFET transistor may be coupled with node through an emitter circuit which is directly coupled with the node.

As usual, the MOSFET starts to conduct when the voltage across the resistor reaches the threshold voltage (gate source voltage) of the MOSFET. However, the threshold voltage has a high variability of typically between 1 to 4 Volt and so there is a big tolerance on the final reverse voltage. In contrast thereto the bipolar transistor has a more precise value of its junction voltage of typical 0.7 V that guarantee a lower tolerance on the final reverse voltage. So, the combination of a MOSFET and a bipolar transistor in an emitter circuit provides the benefit of both the components (bipolar transistor has a defined junction voltage while the MOSFET has an intrinsic diode and higher capacity to keep the surge current.

Therefore, overvoltage protection can be provided with a combination of a bipolar transistor and a MOSFET transistor, wherein the bipolar transistor is connected as an emitter circuit to drive the control input of the MOSFET transistor.

According to a further aspect, a power converter is provided comprising a safety breaker element such as a fuse in one of the high potential and low potential supply lines and above protection circuit connecting the high potential and low potential supply lines, so that when an overvoltage event causes the semiconductor switch to be conductive the resulting current flows through the safety breaker element eventually blowing it.

According to a further aspect, the use of the above protection circuit in a power converter for explosion-protection applications is provided, wherein the power converter comprises a safety breaker element, such as a fuse, in one of the high potential and low potential supply lines and the protection circuit connects the high potential and low potential supply lines, so that when an overvoltage event causes the semiconductor switch to be conductive the resulting current flows through the safety breaker element eventually blowing it.

BRIEF DESCRIPTION OF THE DRAWINGS

Embodiments are described in more detail in conjunction with the accompanying drawings in which.

DESCRIPTION OF EMBODIMENTS

Figure 1A:
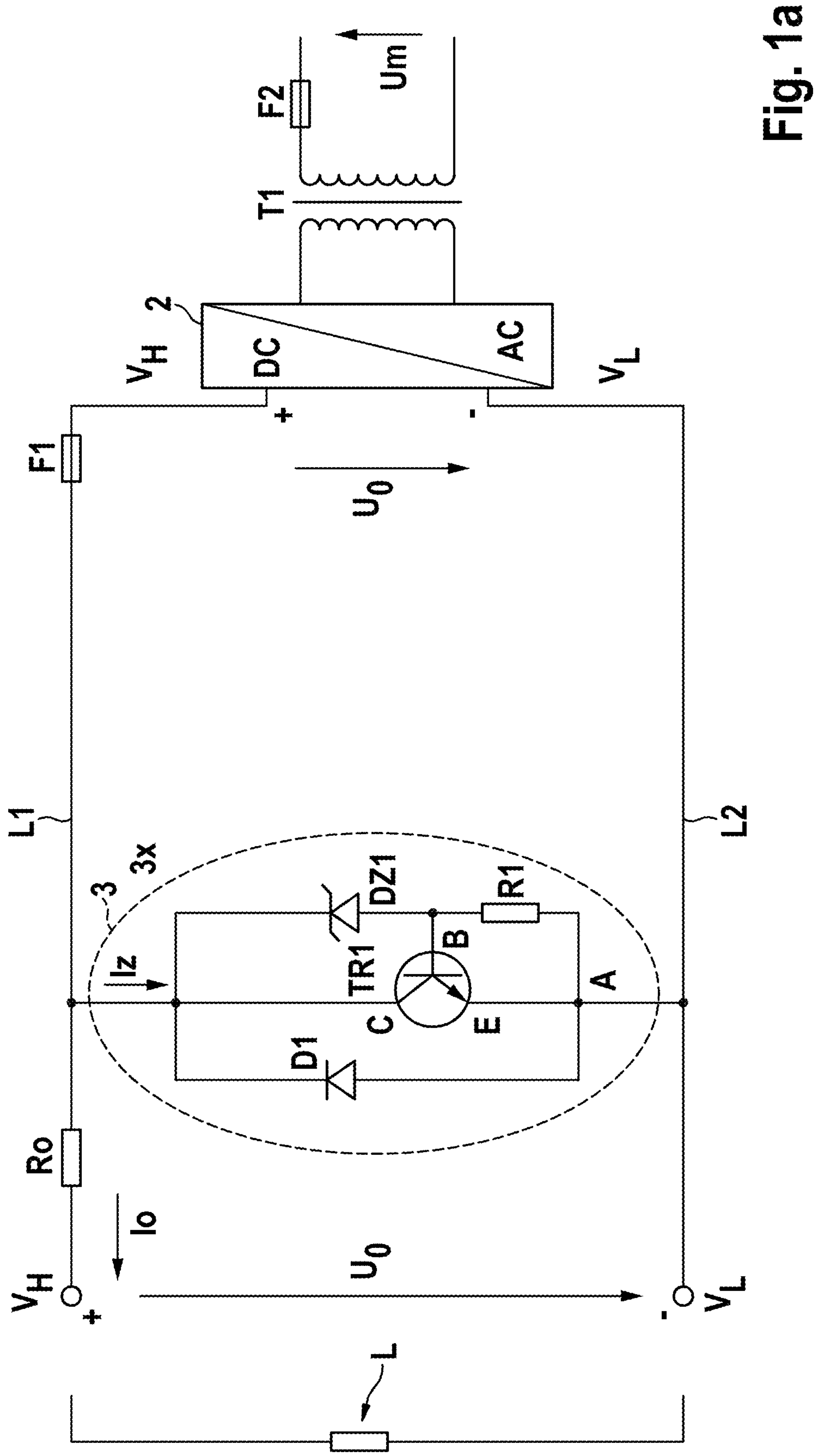
FIGS. 1*a* and 1*b* show schematics of two versions of a protection circuitry for a power converter according to a first embodiment.
Figure 1B:
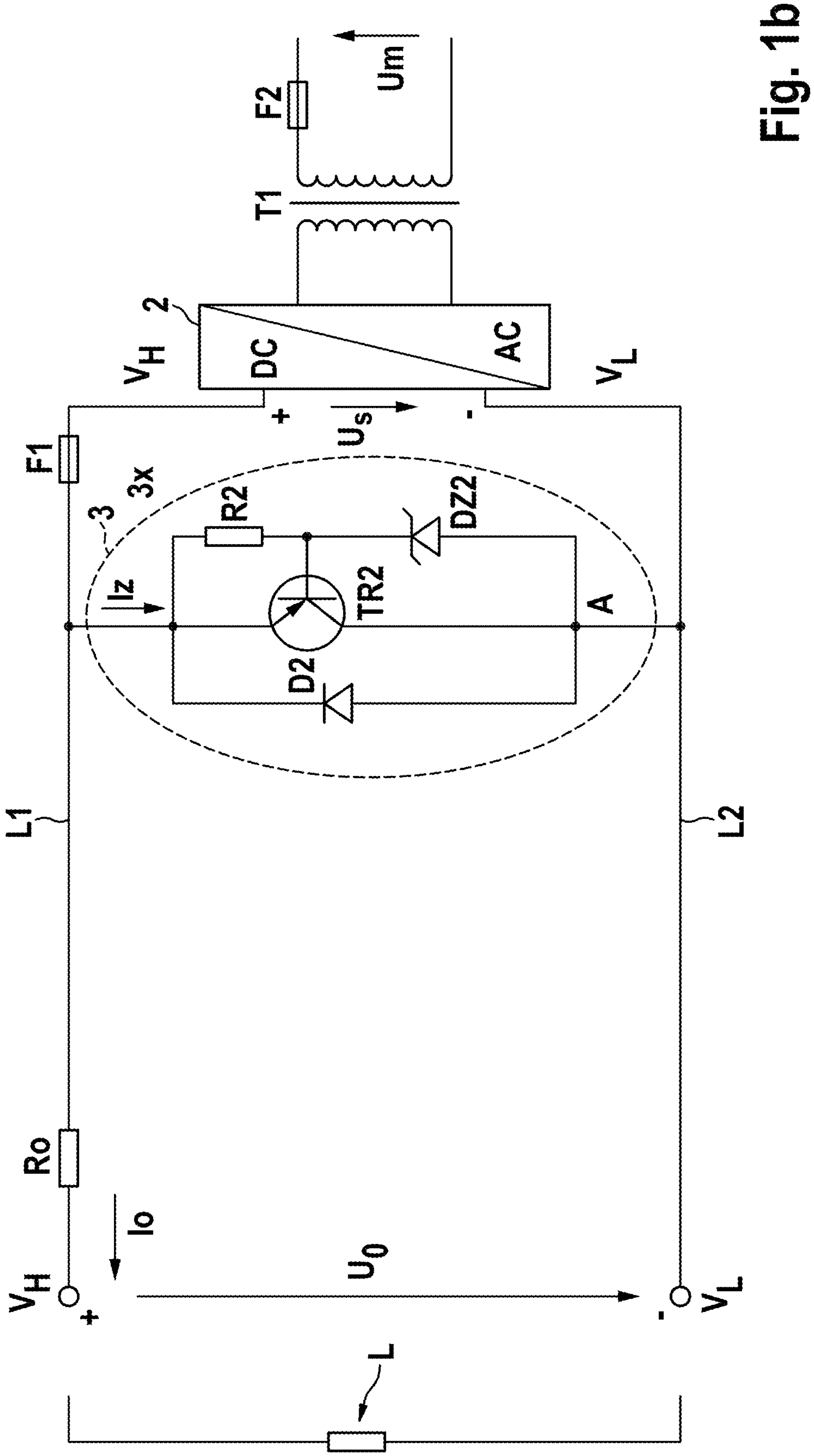

FIGS. 1*a* and 1*b* show schematics of two versions of a power converter with an input site providing an input voltage Um coupled via a transformer T1 and a fuse F2 to an AC-DC converter 2. The AC-DC converter 2 supplies at its output terminals a high and low supply voltage potential $V_H$, $V_L$ of a supply voltage $U_0$ on high potential and low potential supply lines L1, L2 used for providing power to a load L of an application device to be operated particularly in an explosion-protection environment. The high output terminal is connected via a fuse F1 with a protection circuitry 3 to be described in more detail below. The protection circuitry 3 is connected between the high potential and low potential supply line L1, L2. Furthermore, an output resistance $R_0$ and the load L of the application device is connected to the high potential and low potential supply lines L1, L2.

Regarding the embodiment of FIG. 1*a*, it is shown the protection circuit 3 having a NPN bipolar transistor TR1, a first Zener diode DZ1, a first resistance R1 and a first standard diode or Schottky diode D1. The collector terminal C of the NPN bipolar transistor T1 is particularly directly connected with the high potential supply line L1, and the emitter terminal E is particularly directly connected with the low potential supply line L2. The base terminal B of the NPN bipolar transistor TR1 is particularly directly connected via the first resistor R1 with the low potential supply line L2.

The high potential supply line L1 and the base terminal of the NPN bipolar transistor TR1 may be particularly directly connected via the first reverse polarized Zener diode DZ1. Furthermore, the first standard diode or Schottky diode D1 may be particularly directly connected in reverse polarization between the high potential supply line L1 and the low potential supply line L2. When the voltage potential of the high potential supply line L1 increases beyond the reverse voltage of the Zener diode DZ1, the base terminal voltage of the bipolar transistor TR1 increases simultaneously, thereby allowing current to flow through the collector-emitter path of the NPN bipolar transistor TR1 which limits the voltage between the high potential and low potential supply lines L1 and L2 which may cause the fuse F1 to blow.

The embodiment of FIG. 1*b* shows a similar circuitry, while the NPN bipolar transistor has been replaced by a PNP bipolar transistor TR2 wherein a second Zener diode DZ2 may be particularly directly connected between a base terminal B and the low potential supply line L2. Instead of the first resistor, a second resistor R2 may be particularly directly connected between the base terminal B and the high potential supply line L1.

The functionality of the circuitry of FIG. 1*b* is the same as in FIG. 1*a*.

Purpose of the circuits of FIGS. 1*a* and 1*b* is to replace a high power Zener diode capable of carrying a current which may blow the fuse F1, with a combination of components which allow to use a low power Zener diode DZ1 instead.

The mimicked breakthrough voltage of the high-power Zener diode is in the circuitry of FIG. 1*a* the sum of the breakthrough voltage of the first Zener diode DZ1 and the base emitter voltage of the NPN bipolar transistor and in FIG. 1*b* the sum of the breakthrough voltage of the second Zener diode DZ2 and the base emitter voltage of the PNP bipolar transistor TR2.

Basically, the first resistor R1 in series with the Zener diode DZ1 has the purpose to shunt the leakage current that pass into the Zener diode, so to avoid the conduction/amplification of the transistor. When R1=10 KOhm and junction voltage Vbe-on=0.7 V the bipolar transistor remain non-conductive until the current through the Zener diode DZ1 is below 70 μA so that a leakage of 70 μA will not put the transistor TR1, TR2 to conduct. The fuse F1 must guarantee the required functional current through the load L. So its rating will be configured to be just a bit higher than the functional current in the load L.

Figure 2A:
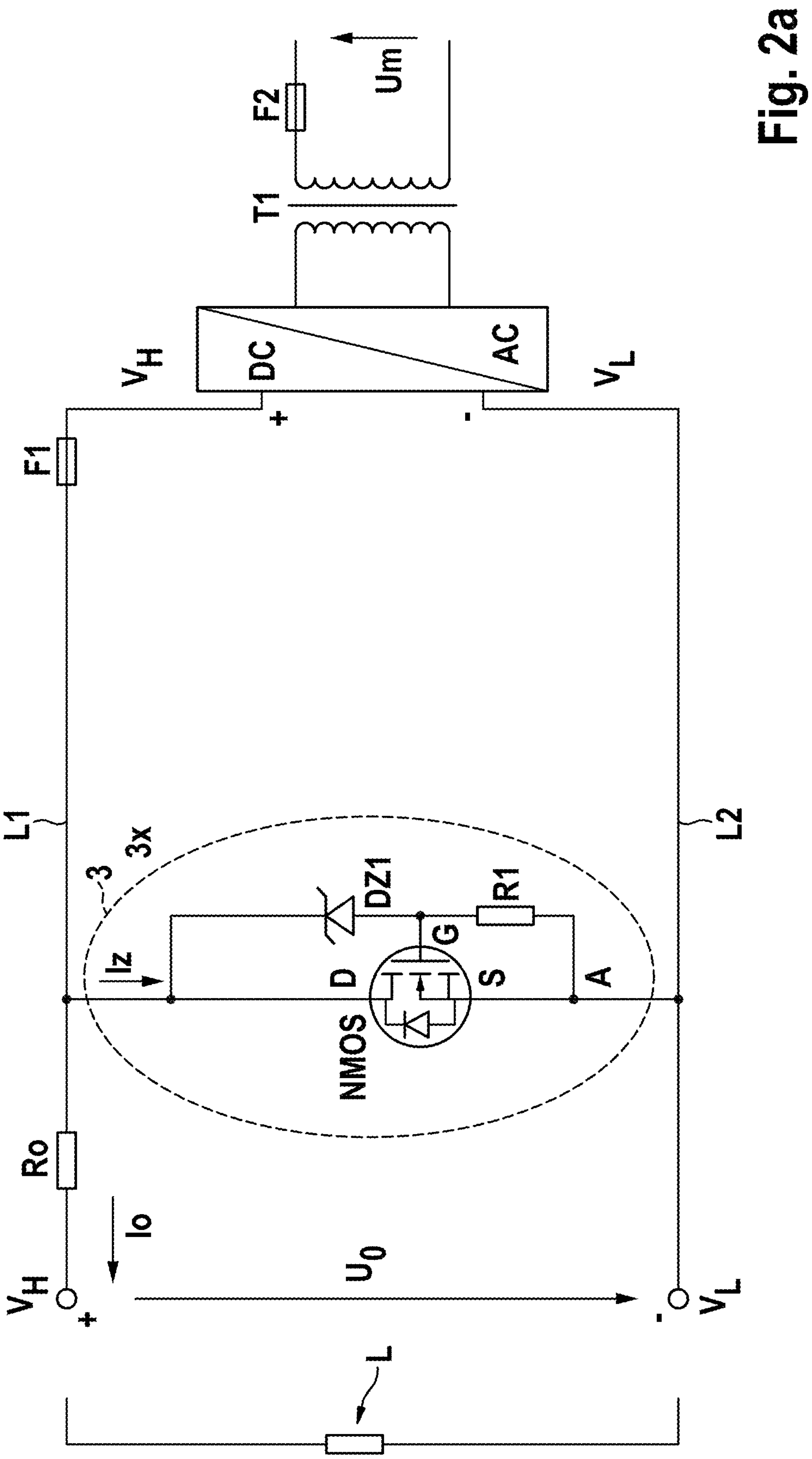
FIGS. 2*a* to 2*b* show schematics of two versions of a protection circuitry for a power converter according to a second embodiment.
Figure 2B:
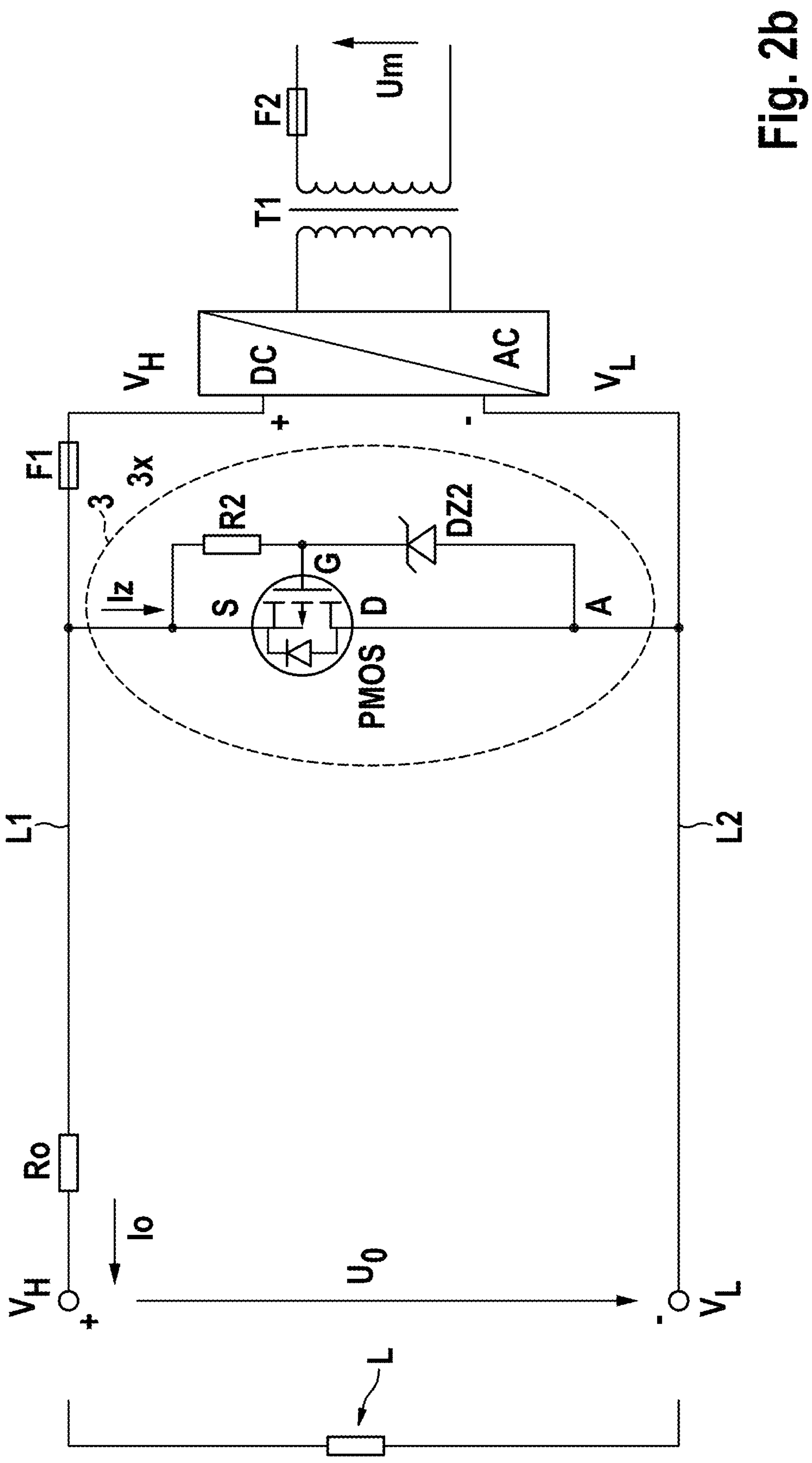

In the embodiment of FIGS. 2*a* and 2*b*, the bipolar transistors TR1, TR2 have been replaced by MOSFET transistors NMOS, PMOS, respectively, being directly connected with its drain D and source S terminals with the high potential and low potential supply lines L1,L2, respectively.

In FIG. 2*a*, the MOSFET corresponds to an N-MOSFET NMOS, while in FIG. 2*b*, the MOSFET corresponds to a P-MOSFET PMOS. Similarly to the circuitry of the embodiments of FIGS. 1*a* and 1*b*, the gate terminal G of the MOSFET is controlled by a node between the reverse polarized first Zener diode DZ1/second Zener diode DZ2 and the first/second resistor R1/R2. The first/second standard/Schottky diodes may be omitted, as the intrinsic diode of the MOSFET transistors can replace the function of the standard/Schottky diodes D1/D2.

Normally, the gate of a MOSFET must not be left floating, so a resistor R1 of between 10 . . . 1000 KOhm is usually placed between its gate G and source terminals S. When R1=10 kOhm and threshold voltage Vgs-on=2.5 V the MOSFET remains off until the current in the first Zener diode DZ1 is below 250 μA so that a leakage of 250 μA will not put the MOSFET to conduct. The fuse F1 must guarantee the required functional current in the load L. So its rating will be configured to be just a bit higher than the functional current in the load.

Figure 3A:
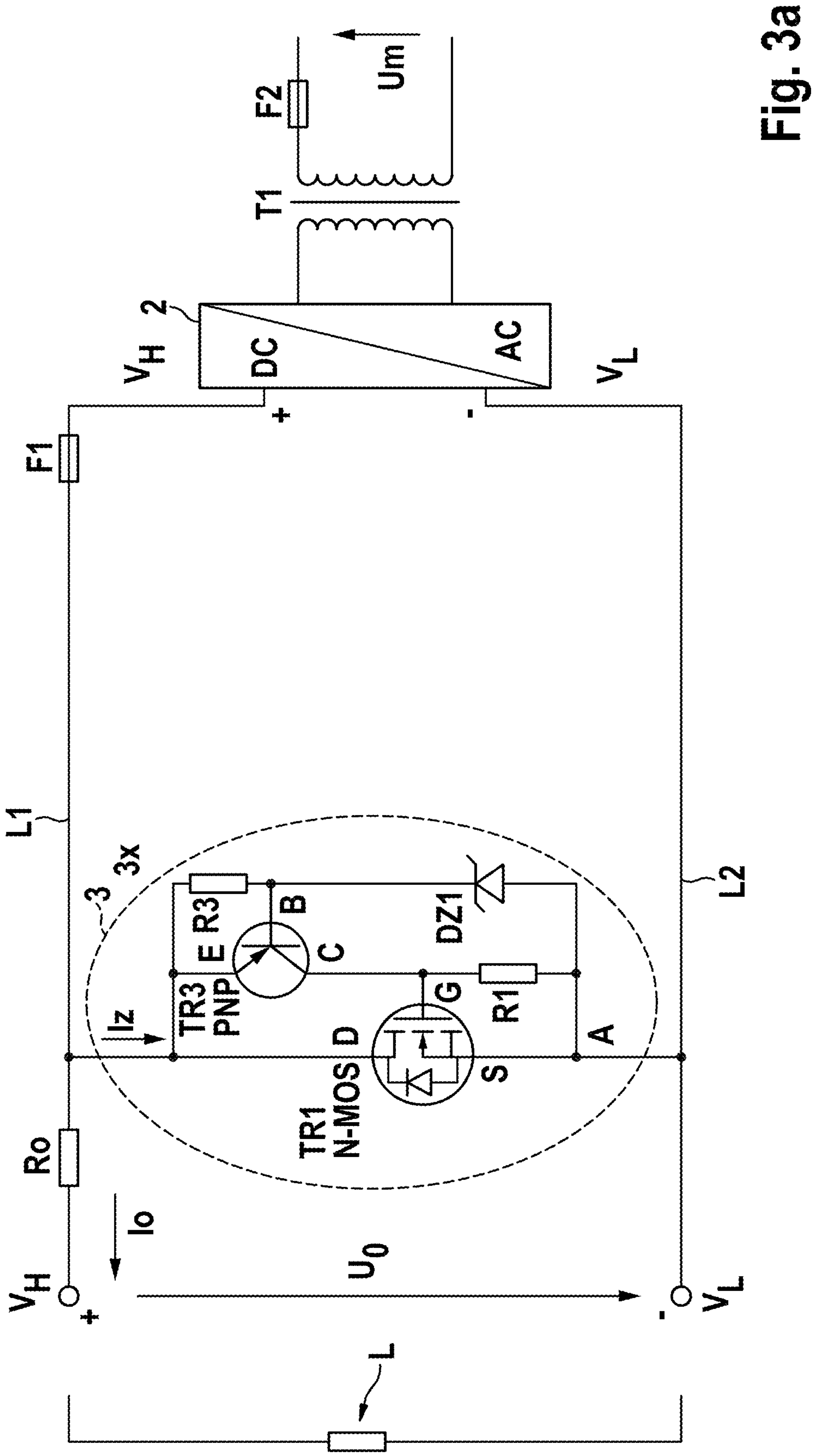
FIGS. 3*a* to 3*b* show schematics of two versions of a protection circuitry for a power converter according to a third embodiment.
Figure 3B:
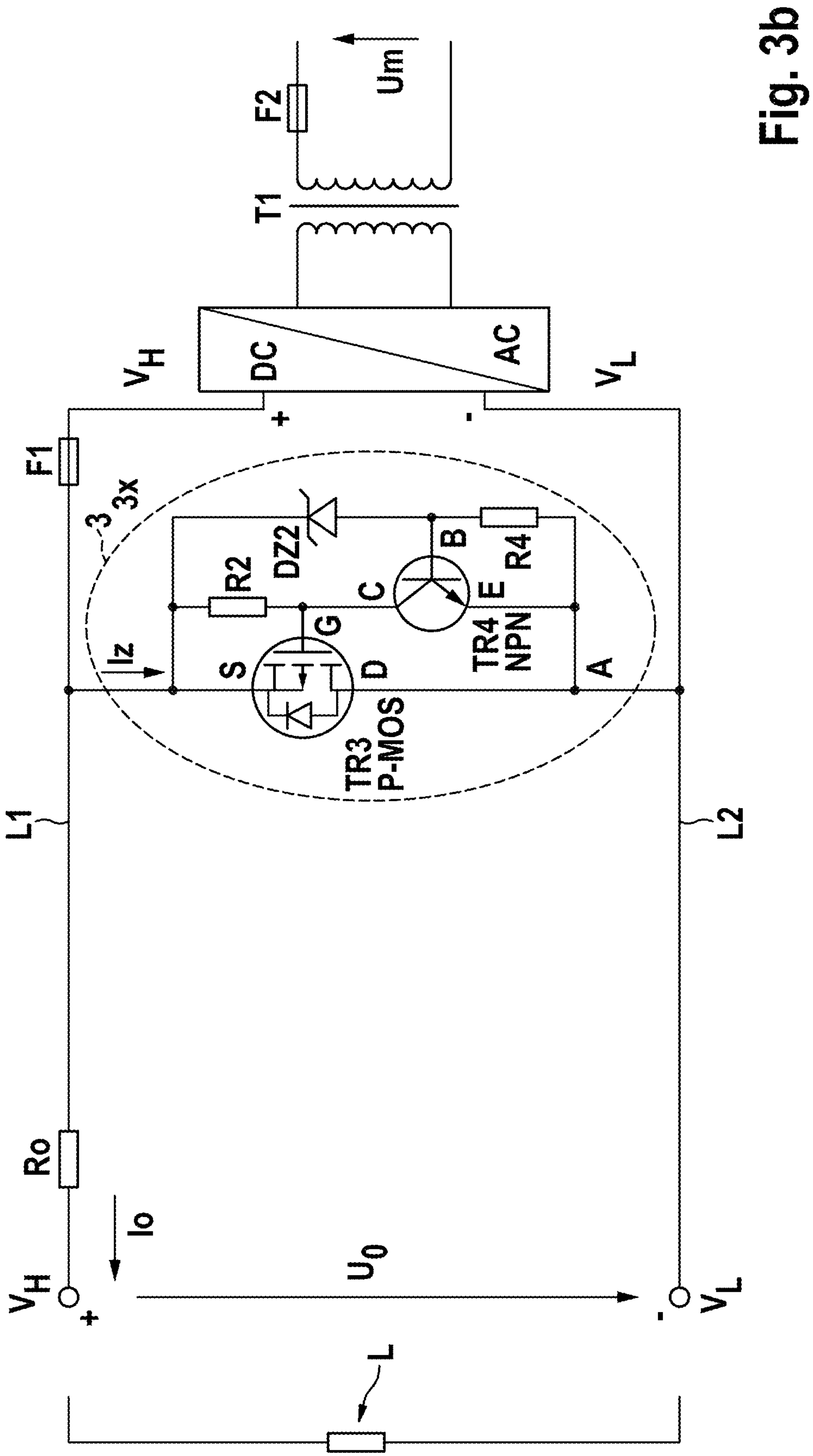

In the embodiments of FIGS. 3*a* and 3*b*, the MOSFET NMOS/PMOS may be driven by an emitter circuit.

In the embodiment of FIG. 3*a*, the emitter circuit comprises a third PNP bipolar transistor TR3 coupled with its emitter terminal E with the high potential supply line L1 and with its collector terminal with a gate terminal G of the N-MOSFET transistor. As above the gate terminal G is connected with the low potential supply line L2 via the first resistor R1. The base terminal B of the third PNP bipolar transistor TR3 is coupled via the first Zener diode DZ1 with the low potential supply line L2 and via a third resistor R3 with the high potential supply line L1 so that the first Zener diode DZ1 and the third resistor R3 form a series connection.

In the embodiment of FIG. 3*b*, the emitter circuit comprises a fourth NPN bipolar transistor TR4 coupled with its emitter terminal with the low potential supply line L2 and with its collector terminal with a gate terminal G of the P-MOSFET transistor PMOS. As above the gate terminal G is connected with the high potential supply line L1 via the second resistor R2. The base terminal B of the fourth NPN bipolar transistor TR4 is coupled via the second Zener diode DZ2 with the high potential supply line L1 and via a fourth resistor R4 with the low potential supply line L2.

The invention claimed is:

1. A protection circuit for a power converter for explosion-protection applications, comprising:

a series connection of a reverse-polarized Zener diode and a resistor to be coupled between a high and a low potential supply line of the power converter; and a semiconductor switch directly coupled between the high and low potential supply line with its conduction path wherein a control terminal of the semiconductor switch is coupled with or controlled by a node between the Zener diode and the resistor;

wherein the semiconductor switch is a bipolar transistor which is configured to have the control terminal current controlled, wherein the sensitive emitter-basis path through the semiconductor switch is in parallel with the resistor.

2. The protection circuit according to claim 1, wherein the semiconductor switch is configured to become conductive when a voltage over the resistor increases over a threshold voltage.

3. The protection circuit according to claim 1, wherein a standard diode or a Schottky diode is coupled between the high and low potential supply lines with reverse polarization.

4. The protection circuit according to claim 1, wherein the semiconductor switch is a MOSFET transistor which is configured to have the control terminal voltage controlled, wherein the sensitive Gate-Source path through the semiconductor switch is in parallel with the resistor.

5. The protection circuit according to claim 4, wherein the MOSFET transistor is coupled with node through an emitter circuit which is directly coupled with the node.

6. The protection circuit according to claim 1, wherein the control terminal of the semiconductor switch is directly coupled with the node.

7. A power converter comprising a safety breaker element in one of the high potential and low potential supply lines and a protection circuit according to claim 1 connecting the high potential and low potential supply lines, so that when an overvoltage event causes the semiconductor switch to be conductive the resulting current flows through the safety breaker element eventually blowing it.

8. Use of the protection circuit of claim 1 in a power converter for explosion-protection applications, wherein the power converter comprises a safety breaker element in one of the high potential and low potential supply lines and the protection circuit connects the high potential and low potential supply lines, so that when an overvoltage event causes the semiconductor switch to be conductive the resulting current flows through the safety breaker element eventually blowing it.

* * * * *